April 16, 1963  G. K. HURLBUT ET AL  3,085,455
CABLE STRIPPING APPARATUS

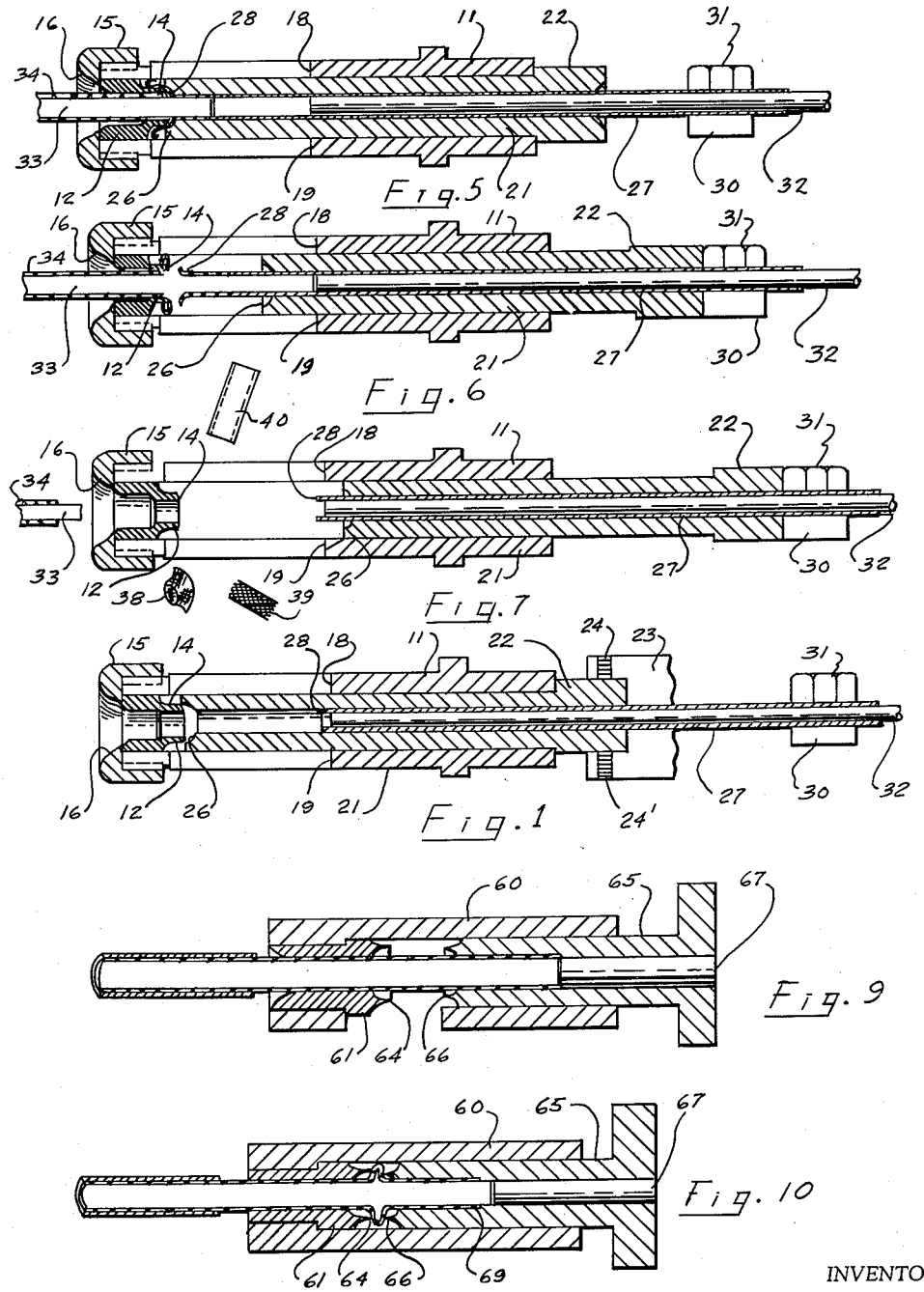

Filed Aug. 1, 1960  2 Sheets-Sheet 2

INVENTOR.
GORDON K. HURLBUT
HAROLD C. REYNOLDS
BY
ATTORNEY

United States Patent Office 3,085,455
Patented Apr. 16, 1963

3,085,455
CABLE STRIPPING APPARATUS
Gordon K. Hurlbut, Chenango Bridge, N.Y., and Harold C. Reynolds, Athens, Pa., assignors to Cadre Industries Corporation, Endwell, N.Y., a corporation of New York
Filed Aug. 1, 1960, Ser. No. 46,513
3 Claims. (Cl. 81—9.51)

This invention relates to apparatus for removing the covering of electrical conductors and, more particularly, for stripping the metallic shielding braid which covers certain types of such conductors.

It is the primary object of this invention to provide an apparatus which is capable of stripping a length of metallic braid covering the insulation of an electrical conductor without damage to the insulation thereof.

It is another object of the invention to provide an apparatus which, upon actuation of mechanical means, is capable of removing desired lengths of the shielding braid in fast successive operations.

It is a particular feature of the invention that the stripping mechanism of the apparatus is simple in construction, including not more than two moving parts and may be easily assembled.

Other objects and features will be apparent from the following description of the invention, pointed out in particularity in the appended claims, and taken in connection with the accompanying drawing, in which:

FIGURE 1 is a sectional view of the stripping head in initial rest position, ready for the introduction of the conductor;

FIGURE 5 is a sectional view of the stripping head with the die sleeve completely closed, severing the looped braid covering;

FIGURE 6 is a view similar to FIGURE 5 with the die sleeve partially withdrawn after cutting operation;

FIGURE 7 is a view similar to FIGURE 6 showing both the die sleeve and the folding sleeve completely withdrawn and the cut off braid portions ejected;

FIGURE 9 is a cross-sectional view of a modified form of the stripping head utilizing a unitary folding and cutting sleeve in extended position ready for operation; and FIGURE 10 is a view similar to FIGURE 9 with the unitary sleeve in partially closed position, about to cut the looped braid.

Figure 8:
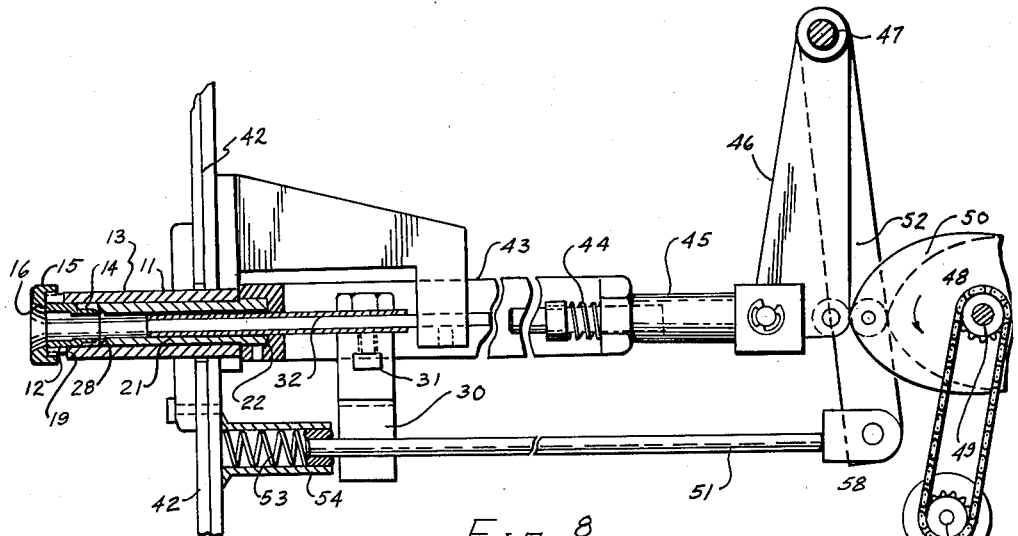
FIGURE 8 is a side elevational view showing the stripping head in cross-section and, by way of example, one type of mechanical assembly for the actuation of the sliding elements.

Various devices have been proposed and constructed for the stripping of insulation or shielding covering of electrical conductors.

Such devices generally employ a cutting knife for circumferentially undercutting the covering at a required length and another cutting knife edge which makes an axial cut along the length to be removed. Both of these operations require precision tooling so as to prevent injuring the insulating covering which is underneath the shielding braid.

The apparatus, in accordance with the present invention, departs from the above operative procedure in that no cutting operation is performed on the shielding braid while it is in close contact with the insulating covering which it normally surrounds. Instead, means are provided for folding back the shielding braid over a portion of the inner insulating medium which surrounds the conducting wire and form, thereby, a radially extending bead or loop. The latter is then cut in a direction axial to the conductor by means of circumferentially engaging cutting edges which sever the looped braid.

Referring to the FIGURES 1 through 8 which illustrate a preferred embodiment of the invention, it is seen that the stripping apparatus consists of relatively few parts. A shell or body portion 11 of tubular cross-section is the stationary support and may be mounted in any suitable manner in the framework of a mechanical assembly for the actuation of the moving elements positioned within the shell.

While the stripping head is particularly intended for industrial use and for power operation and its function is so illustrated here, it is relatively small in size so that with suitable modification of its actuating mechanism, it may be accommodated in a casing for manual operation.

As seen in FIGURE 1, the shell 11 has at one open end, a fixed annular bushing 12, which extends inwardly and terminates in a ring punch 14 of reduced diameter. The bushing 12 is held at the end of the shell 11 by a ring nut 15, which has a flared contour at 16, so as to blend with the inner face of the bushing 12 and provide a smooth, continuous cylindrical surface for the insertion of the end of an electrical conductor of which the metallic braid covering is to be stripped. It is to be noted that the shell 11 has exit openings cut at opposite sides, as indicated at 18 and 19, and that the section in the various views is taken as being cut through said openings. The purpose of these openings will be explained later.

Continuing with the description of FIGURE 1, a die sleeve 21 of tubular cross-section is inserted within the shell 11 and dimensioned to have a sliding fit therein. At one end, the die sleeve 21 extends from the shell 11 and has a portion 22 of larger diameter for the attachment of suitable power means for sliding of the die sleeve in a direction axial to the shell 11. The power means for effecting sliding movement of the die sleeve 21 may have various forms such as a lever arm 23, which may be attached to the portion 22 by set screws 24 and 24'. Whatever type of actuating mechanism is used, its sole purpose is to slide the die sleeve 21 within predetermined limits inwardly and outwardly of the shell 11.

The other end of the die sleeve 21 terminates in a circumferential cutting edge 26 which, in the form of a cup, fits over the ring punch 14, thus serving the purpose of a punch and die assembly. For this reason, the sleeve 21 is termed a "die" sleeve.

The second moving element of the stripping head is the folding sleeve 27, which is also of tubular cross-section and dimensioned to have a sliding fit within the die sleeve 21 and is of such inner diameter as to fit over the insulation covering of an electrical conductor, but not over the metallic braid which covers the insulation. The wall thickness of the folding sleeve 27 is such that the end 28 thereof will abut against the metallic braid and, when moved inwardly of the shell 11 in the die sleeve 21, it will push the metallic braid covering along the insulated portion. This will be more fully explained in connection with the operation of the stripping head with reference to the various figures which illustrate the relative positions of the die sleeve 21 and the folding sleeve 22.

The other end of the folding sleeve 27 extends from the portion 22 of the die sleeve 21 for the attachment of suitable power means for effecting the sliding operation within predetermined limits inwardly and outwardly of the die sleeve 21. An attachment, by way of example, is illustrated by the block 30, which may represent a portion of the lever arm affixed to the folding sleeve 27 by means of the set screw 31.

Within the hollow folding sleeve 27 is placed a rod 32, which is another stationary element of the assembly except that it may be positioned at desired fixed points and has the function of providing a stop for the end of the inserted electrical conductor.

Now let us consider the operation of the stripping head from the start to the end of its operating cycle. In FIGURE 1, the assembly is in rest position ready for the insertion of the wire. The die sleeve is in fully inward position with the cutting edge 26 over the die punch 14 so that a smooth-walled tubular housing is formed which is, of course, dimensioned as to its diameter to accept a certain size of insulated and braided conductor, so that it may be inserted easily by the operator and held in inserted position during stripping operation.

Figure 2:
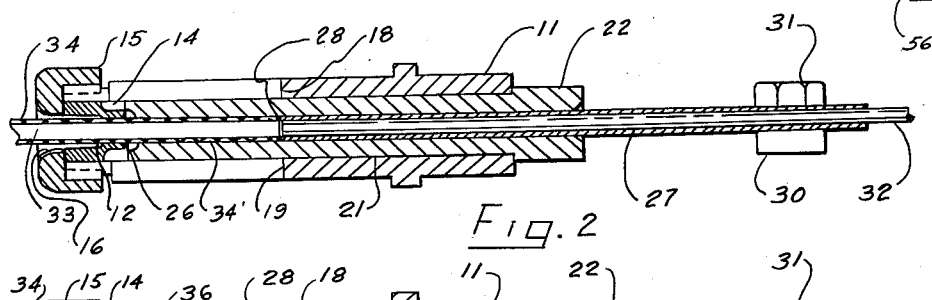
FIGURE 2 is a view similar to FIGURE 1 with the conductor in place ready to be stripped.

It is seen in FIGURE 2 that an electrical conductor 33 having a metallic braid covering 34 is now inserted into the stripping head. It should be noted, as seen in FIGURE 1, that the rod 32 is so positioned that the folding sleeve 27, in its rest position, extends slightly beyond the end of the rod 32, thus forming a small cup-shaped end. As the conductor 33 is inserted, the insulating portion will fit into this cup while the braid will be slightly pushed back inasmuch as it abuts against the end of the sleeve 27.

Figure 3:
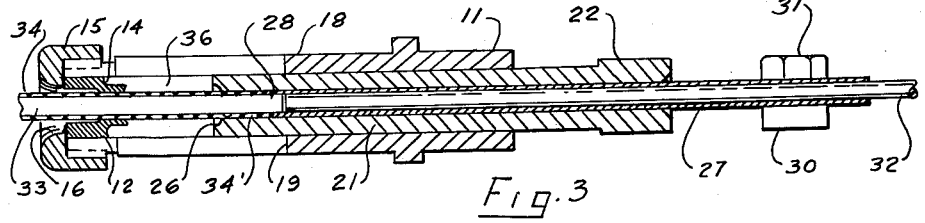
FIGURE 3 is a view similar to FIGURE 2 with the die sleeve fully withdrawn.

When the conductor is in the position shown in FIGURE 2, the stripping head is ready for operation and the power drive may be initiated to effect the sequential actuation of the two moving elements; namely, the die sleeve 21 and the folding sleeve 27, which will operate partly in sequence and partly in unison, as follows:

First, the die sleeve 21 is retracted, sliding outwardly from shell 11 to a predetermined extent until it reaches the position shown in FIGURE 3. It should be noted that a portion of the shielding braid 34 is now uncovered but the end, as indicated at 34', is still trapped under the die sleeve 21. Moreover, by virtue of this movement of the die sleeve 21, a cylindrical chamber 36, defined by the inner wall of the shell 11, has been formed, providing the needed space for the expansion of the braid 34.

Figure 4:
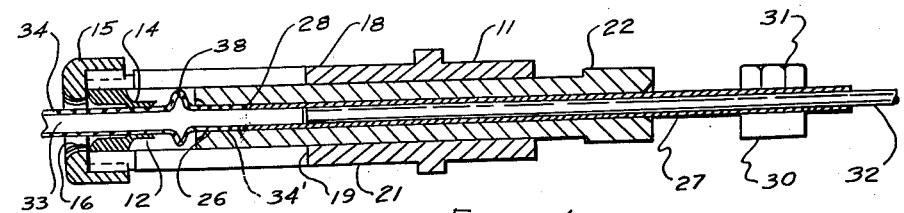
FIGURE 4 is a view similar to FIGURE 3 with the folding sleeve partially over the conductor and the die sleeve progressed toward the looped shielding.

In the next ensuing operation, the die sleeve 21 and the folding sleeve 27 start to move forward in unison. The latter constrains the braid 34 to fold back over the insulation of the conductor and to buckle and form a loop 38, as seen in FIGURE 4. As this operation continues, the loop 38 is pushed against the shearing edge of the ring punch 14 and will be cut off when the moving elements reach the position seen in FIGURE 5.

In the next operating cycle, the die sleeve 22 slides outwardly until the folding sleeve 27 protrudes slightly beyond the shearing edge 26 as seen in FIGURE 6. At this point, the operator may remove the wire 33. The loop 38 and the remaining portion 39 of the braid 34 may now be ejected through the bottom slot 19. This can be most conveniently done by an air blast from a nozzle 40, shown schematically by way of example, directed at the upper slot 18. The next operation returns both the die and folding sleeves 21 and 27, respectively, to the starting position shown in FIGURE 1.

As mentioned before, various forms of actuating mechanisms may be employed to provide the sequential operations of the two moving elements. In a commercial application of the invention, use was made of a rotating cam and lever arrangement along the lines schematically shown in FIGURE 8. The stripping head 13 is held in a framework 42 which represents the stationary parts and casing of the apparatus. The die sleeve 21 is attached to the forked rod 43 which, biased by the spring 44, is actuated by the bar 45 of the lever 46 pivoted at 47. The lever 46 is constrained by the cam 48 affixed to the shaft 49 which is rotated by any suitable motor means, as shown by way of illustration by the electric motor 56 having its pinion 57 coupled by the drive chain 58 with the pinion 59 secured to the shaft 49 of the cam 48.

In a similar manner, the folding sleeve 27, attached to the block 30 fastened to the rod 51, is moved by lever 52, also pivoted at 47 and constrained by the cam face 50 of the cam 48. The rod 51 is also biased by the spring 53 placed in a housing 54 attached to the frame 42. For the sake of simplicity in illustration, only a simple elliptical configuration is shown for the cam 48. The lobe configuration may be varied to obtain any desired sequential and unitary sliding movement of the sleeves 21 and 27 respectively.

The modification of the stripping head shown in FIGURES 9 and 10 combines cutting and folding functions into a single sliding element. The stationary member 60 is similar to the shell 11 in FIGURES 1 through 8, which illustrate the preferred form of the invention, and consists essentially of an elongated tubular housing having at the front end, a bushing 61 which, by virtue of its flared end provides a guide for the entrance of the electrical conductor. The other end of the bushing 61 has a reduced diameter and is ground to have a circular cutting edge 64. The bushing 61 may be threaded or affixed to the end of the stationary member 60 in any suitable manner.

The sliding element 65 is in the form of a piston having a front portion terminating in a circular cutting edge 66 of such reduced diameter as to cooperate with the cutting edge 64 of the bushing 61. The element 65 has an axial bore 67 of such diameter in the front portion as to accommodate the insulated wire 33 and the braid covering 34 and of such depth as to permit the insertion of a length of shielded wire desired to be stripped. The bore 67 is recessed in the back portion to permit the entry of the insulation covering of the wire 33, but not that of the shielding braid 34. The latter is engaged by the wall formed by the recess at 69.

The operation of the modification shown in FIGURES 9 and 10 is very similar to the preferred embodiment hereinabove described. In the position shown in FIGURE 9, the stripping head is ready for the insertion of the wire to be stripped. As a matter of fact, for the simplicity of illustration, FIGURE 9 shows the device loaded with a length of wire 33 inserted through the bushing 61 as far as it may enter when the shielding braid 34 engages the recessed portion at 69. The sliding element 65 is in its fully open position. Upon inward movement of the sliding element 65, pressure is exerted by the ledge of the recessed portion at 69 on the shielding braid 34 which is thereby constrained to expand in the space between the cutting edges 64 and 66. Upon complete inward motion of the sliding element 65, as seen in FIGURE 10, the braid 34, now formed into a loop 38, is severed between the coengaging cutting edges 64 and 66. It is to be noted that as the sliding element 65 progresses toward the bushing 61 and the shielding braid 34 is folded back, the insulation portion of the wire 33 enters into the reduced diameter of the bore 67 so that there is no constraining action on the wire itself. Upon completion of the cutting operation, the sliding element 65 is again moved outwardly and the cut-off bead 38, as well as the shield portion 39, may be removed after the wire 33 is withdrawn from the stationary member 60 through an opening at 70 in a manner similar to the removal shown in FIGURE 7.

While the invention is chiefly concerned with the expeditious stripping of the metallic shielding braid of an electrical conductor, it is not necessarily limited thereto. The apparatus herein described may be used equally well in the removal of non-metallic braided coverings.

What is claimed is:

1. In an apparatus for stripping the metallic braid covering of insulated electrical conductors, a fixed support having inner walls defining a cylindrical chamber, said chamber having an open end, cutting means comprising a die sleeve axially slidable in said chamber, having at one end a circular shearing edge, and a fixed annular ring punch at the open end of said support through which a length of said conductor may be inserted, the inward end of said ring punch having a circular shearing edge co-operating with the shearing edge of said sleeve; a folding sleeve slidable in said die sleeve having an inner diameter so dimensioned as to accommodate the insulated portion of said conductor and a wall thickness sufficient to abut against the metallic braid covering said conductor, whereby upon sliding movement of said folding sleeve, said braid is forced to fold back upon said insulated portion and to expand into a loop, said expanded loop extending between the shearing edges of said cutting means, and power means for effecting sliding movement of said folding sleeve to the extent of forming said loop and for effecting sliding movement of said die sleeve for engagement of said shearing surfaces, and thereby the severance of said looped braid, said ring punch and said die sleeve terminating in a cup into which said ring punch fits, said ring punch being of reduced diameter forming at the inner wall of said support a cavity which accommodates said severed loop braid.

2. In an apparatus for stripping the metallic braid covering of insulated electrical conductor, a fixed support having inner walls defining a cylindrical chamber, said chamber having an open end, cutting means comprising a die sleeve slidable in said chamber having at one end a circular shearing edge and a fixed annular bushing at the open end of said support through which a length of said conductor may be inserted, the inward end of said bushing having a circular shearing edge cooperating with the shearing edge of said sleeve; a folding sleeve slidable in said die sleeve having an inner diameter so dimensioned as to accommodate the insulated portion of said conductor and a wall thickness sufficient to abut against the metallic braid covering said conductor, whereby upon sliding movement of said folding sleeve, said braid is forced to fold back upon said insulated portion and to expand into a loop, said expanded loop extending between the shearing edges of said cutting means, a rod within said folding sleeve and positionable along the axis thereof for determining the length of the inserted conductor and thereby the length of braid to be stripped, means for securing said rod at a desired position to said support, and power means for effecting sliding movement of said folding sleeve to the extent of forming said loop and for effecting sliding movement of said die sleeve for engagement of said shearing surfaces, and thereby the severance of said looped braid.

3. An apparatus in accordance with claim 2 wherein said power means comprises a first lever arm attached to said die sleeve, and a rotary cam having a cam face engaging said arm; a second lever arm attached to said folding sleeve and another cam face of said cam engaging said second arm.

References Cited in the file of this patent
UNITED STATES PATENTS

| | | |
|---|---|---|
| 2,608,394 | Andren | June 8, 1954 |
| 2,765,685 | Stratman et al. | Oct. 9, 1956 |
| 2,929,285 | Gulemi | Mar. 22, 1960 |
| 2,988,940 | Folkenroth et al. | June 20, 1961 |